US009069654B2

(12) United States Patent
Goshi

(10) Patent No.: US 9,069,654 B2
(45) Date of Patent: Jun. 30, 2015

(54) INVERTER DEVICE

(71) Applicant: Toshiba Schneider Inverter Corporation, Mie (JP)

(72) Inventor: Yoichi Goshi, Mie (JP)

(73) Assignee: Toshiba Schneider Inverter Corporation, Mie-gun, Mie (JP)

( * ) Notice: Subject to any disclaimer, the term of this patent is extended or adjusted under 35 U.S.C. 154(b) by 156 days.

(21) Appl. No.: 13/949,429

(22) Filed: Jul. 24, 2013

(65) Prior Publication Data

US 2014/0032842 A1    Jan. 30, 2014

(30) Foreign Application Priority Data

Jul. 25, 2012  (JP) ................. 2012-164725

(51) Int. Cl.
G06F 12/00   (2006.01)
G05B 23/02   (2006.01)

(52) U.S. Cl.
CPC ............ G06F 12/00 (2013.01); G05B 23/0264 (2013.01)

(58) Field of Classification Search
CPC ............................ G06F 12/00; G05B 23/0264
USPC .......... 711/115, 103, 154; 365/185.33; 714/1, 714/4.12, 6.11
See application file for complete search history.

(56) References Cited

U.S. PATENT DOCUMENTS

| 7,707,327 | B2 | 4/2010 | Namba |
| 8,645,937 | B2 * | 2/2014 | Angerer et al. ............... 717/168 |
| 2004/0195992 | A1 | 10/2004 | Shimizu et al. |
| 2005/0049945 | A1 | 3/2005 | Bourbonnais et al. |
| 2006/0113953 | A1 | 6/2006 | Shimizu et al. |
| 2008/0133780 | A1 | 6/2008 | Niemi |
| 2010/0315850 | A1 | 12/2010 | J'Neva Davi et al. |
| 2011/0283272 | A1 | 11/2011 | Angerer et al. |
| 2012/0126623 | A1 * | 5/2012 | Koehl ............................ 307/76 |
| 2012/0131295 | A1 | 5/2012 | Nakajima |

FOREIGN PATENT DOCUMENTS

| EP | 1 450 265 | 8/2004 |
| EP | 1 926 206 | 5/2008 |
| JP | 2005-049945 | 2/2005 |
| JP | 2007-537500 | 12/2007 |
| WO | WO 2005/111772 | 11/2005 |

OTHER PUBLICATIONS

European Search Report issued in EP 13174516.8 dated Nov. 27, 2014, pp. 1-9.

(Continued)

Primary Examiner — Stephen Elmore
(74) Attorney, Agent, or Firm — DLA Piper LLP (US)

(57) ABSTRACT

An inverter device includes an inverter main circuit to which a load is connected, an input unit configured to receive an input operation by a user, a connector into which a hot-pluggable external storage device is insertable, and a control unit configured to control writing of a log to the external storage device inserted into the connector. When the external storage device is inserted in the connector, the control unit switches the external storage device to a connected state in which the log is allowed to be written to the external storage device. When the input unit receives the input operation during the connected state of the external storage device, the control unit stops writing of the log to the external storage device and switches the external storage device to a disconnected state in which the external storage connector is removable from the connector.

19 Claims, 15 Drawing Sheets

(56) References Cited

OTHER PUBLICATIONS http://www.graphtecamerica.com/docs/User_Manuals/Instruments_UM/GL900/GL900-UM151.pdf, pp. 1-97.
English Language Abstract and Translation for JP 2005-049945 published Feb. 24, 2005, pp. 1-13.

English Language Abstract of JP 2007-537500 published Dec. 20, 2007, pp. 1-2.

English Language Translation of JP 2007-537500 published Dec. 20, 2007, pp. 1-54.

* cited by examiner

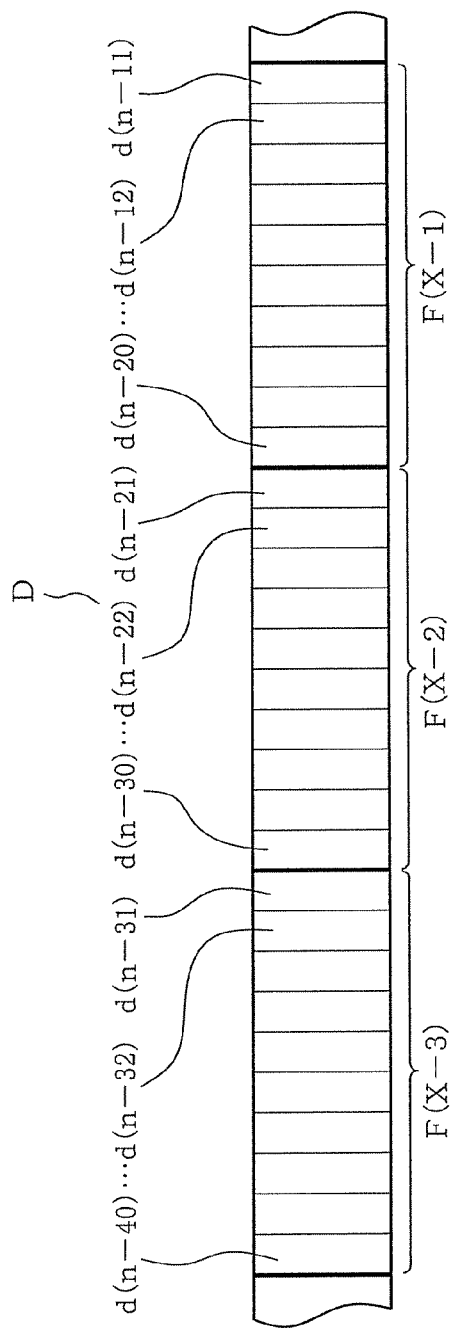
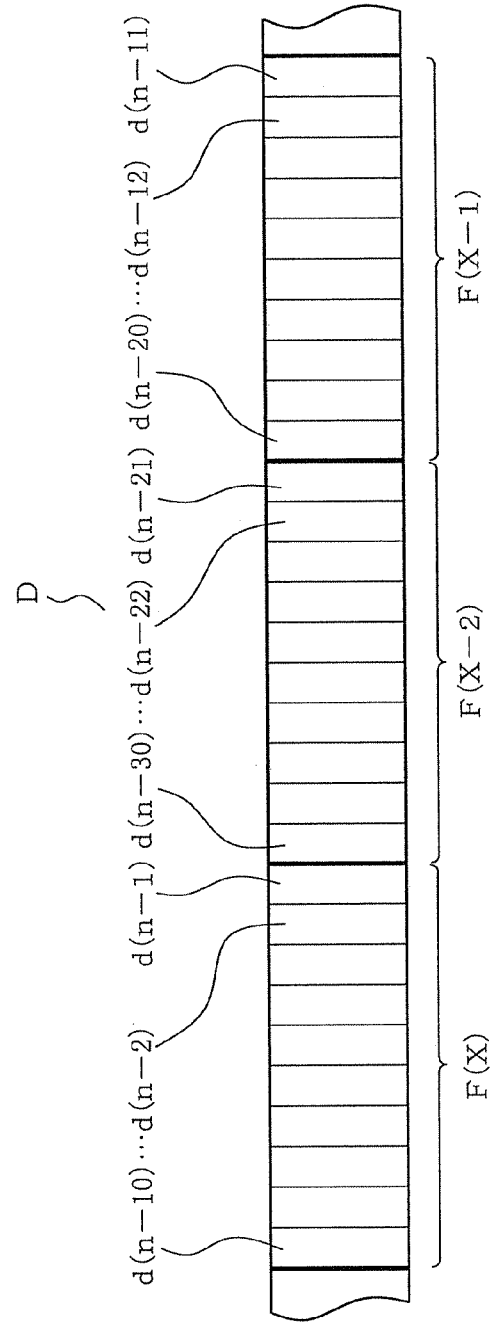

INVERTER DEVICE

CROSS-REFERENCE TO RELATED APPLICATIONS

This application is based upon and claims the benefit of priority from the prior Japanese Patent Application No. 2012-164725 filed on Jul. 25, 2012, the entire contents of both of which are incorporated herein by reference.

FIELD

Embodiments described herein relate to an inverter device.

BACKGROUND

There have conventionally been demands to collect logs relating to operating conditions of an electric motor or operating conditions of an inverter device in order that soundness of a whole system may be confirmed in the inverter device for motor drive by grasping a driving condition of the motor and the like or in order that a running rate of the whole system may be improved by making a maintenance program from a load status and an operating time of the motor. In order that logs may be collected without stop of the inverter device, the use of an external storage device has been proposed as the destination to save. The external storage device may include universal serial bus (USB) memories which are hot-swappable.

In this case, log acquisition in the inverter device is not always carried out by a skilled user. Accordingly, a complicated operation should be avoided in log acquisition as much as possible.

BRIEF DESCRIPTION OF THE DRAWINGS

FIGS. 13A and 13B are conceptual illustrations of unit logs stored in the external storage device in the state (A) before earliest unit logs stored on the external storage device is rewritten and in the state (B) where the earliest unit logs stored on the external storage device have been rewritten into updated unit logs;

DETAILED DESCRIPTION

In general, according to one embodiment, an inverter device includes an inverter main circuit to which a load is connectable, an input unit which is configured to receive an input operation by a user, a connector into which hot-pluggable external storage device is insertable and a control unit which is configured to control writing of a log to the external storage device inserted in the connector. The log is pertinent to operating conditions of the load. When the external storage device is inserted in the connector, the control unit switches the external storage device to a connected state in which the log is allowed to be written to the external storage device. When the input unit receives the input operation during the connected state of the external storage device, the control unit stops write of the log to the external storage device and switches the external storage device to a disconnected state in which the external storage connector is removable from the connector.

Several embodiments will be described with reference to the accompanying drawings. Identical or similar parts will be labeled by the same reference symbols throughout the embodiments.

Figure 1:
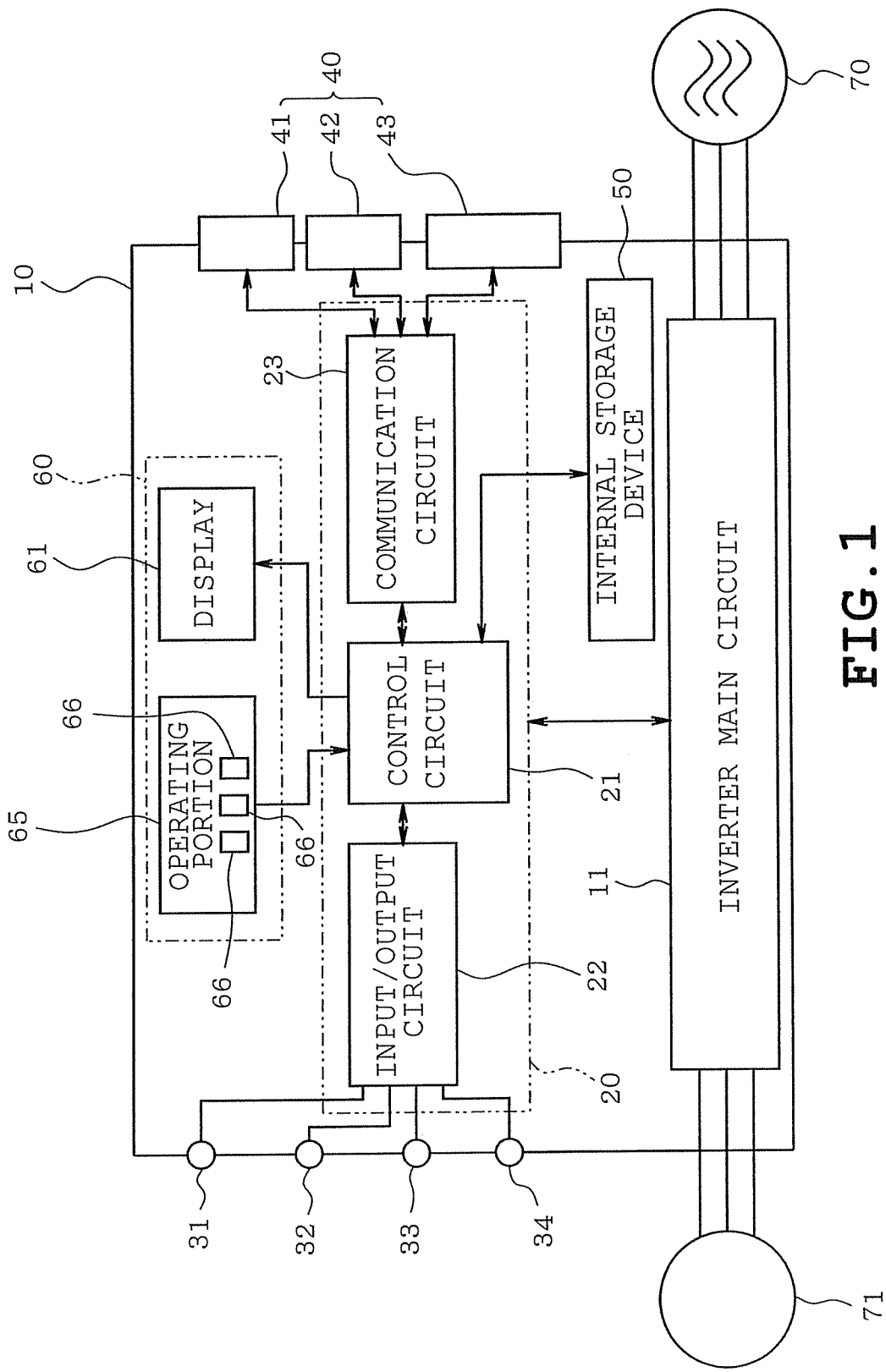
FIG. 1 illustrates a schematic electrical arrangement of an inverter device according to a first embodiment.

A first embodiment will be described with reference to FIGS. 1 to 13. Referring to FIG. 1, an inverter device 10 according to the first embodiment is shown. The inverter device 10 includes an inverter main circuit 11, a control device 20, a plurality of, for example, two input terminals 31 and 32, a plurality of, for example, two output terminals 33 and 34, a plurality of, for example, three connectors 40, an internal storage device 50 and an operation panel 60. The inverter main circuit 11 includes a converter composed of diodes connected into a three-phase bridge configuration and an inverter composed of switching elements connected into a three-phase bridge configuration, for example, all of which are not shown. A three-phase AC power supply 70 is connected to an input side of the inverter main circuit 11, for example. An electric motor 71 serving as a load is connected to an output side of the inverter main circuit 11. The control device 20 is configured to control the inverter main circuit 11, which is configured to control the motor 71.

The control device 20 serving as a control unit includes a control circuit 21 as a main component, an input/output circuit 22 and a communication circuit 23. The control circuit 21 is electrically connected to input/output circuit 22 and also to the communication circuit 23. The control circuit 21 is mainly composed of a microcomputer including a CPU, a ROM, a RAM, an A/D converter and various interface circuits. The control circuit 21 is configured to execute processing relating to motor control, various settings, display, input/output and the like in accordance with a control program written to the ROM.

In the input/output circuit 22, the input terminals 31 and 32 are connected to each other and the output terminals 33 and 34 are connected to each other. Various external devices are to be connected to the input terminals 31 and 32 and the output terminals 33 and 34. The control circuit 21 is configured to receive via the input/output circuit 22 signals from external devices connected to the input terminals 31 and 32 and to supply signals to external devices connected to the output terminals 33 and 34.

The communication circuit 23 is connected to a connector 40. The connector 40 includes two USB connectors 41 and 42 complying with the Universal Serial Bus (USB) and an SD connector 43 complying with the Secure Digital (SD). A USB memory serving as an external storage device is insertable into each of the USB connectors 41 and 42. An SD memory card serving as an external storage device is insertable into the SD connector 43. Each of the USB and SD memories is constituted by a rewritable non-volatile memory such as flash memory. The connector 40 refers collectively to the connectors 41, 42 and 43 in the following description.

The communication circuit 23 is composed of an interface circuit complying with the USB and SD Standards. The communication circuit 23 communicatingly connects between an external storage device connected to the connector 40 and the control circuit 21. The external storage device to be inserted into the connector 40 and the communication circuit 23 accommodate to hot-swap. More specifically, the inverter device 10 is configured so that an external storage device is connectable to and removable from the connector 40 even in a power-on state of the inverter device 10. The control circuit 21 is configured to read and write data from and to the external storage device inserted in the connector 40 via the communication circuit 23. In this case, the data is logs relating to an operating status of the inverter device 10.

The internal storage device 50 is connected to the control circuit 21 and that is, to the control device 20. The internal storage device 50 is composed of a rewritable non-volatile memory such as a flash memory or an electrically erasable programmable read-only memory (EEPROM). On the internal storage memory 50 are stored various set contents changed by the user, and logs of the inverter 10 as needed.

The operation panel 60 has a display 61 and an operating portion 65 both of which are connected to the control circuit 21 and the control device 20. The display 61 is composed of a liquid crystal panel, for example. The control device 20 is configured to control the display 61 so that various pieces of information such as set contents and operating status are displayed on the display 61. Furthermore, the display 61 has status display areas 621, 622 and 623 corresponding to the connectors 41, 42 and 43 respectively. The control device 20 is configured to further control the display 61 so that statuses of the external storage devices inserted in the connectors 41, 42 and 43 are displayed on the display 61 in a manner such that the statuses are discriminable from one another, respectively.

Figure 2:
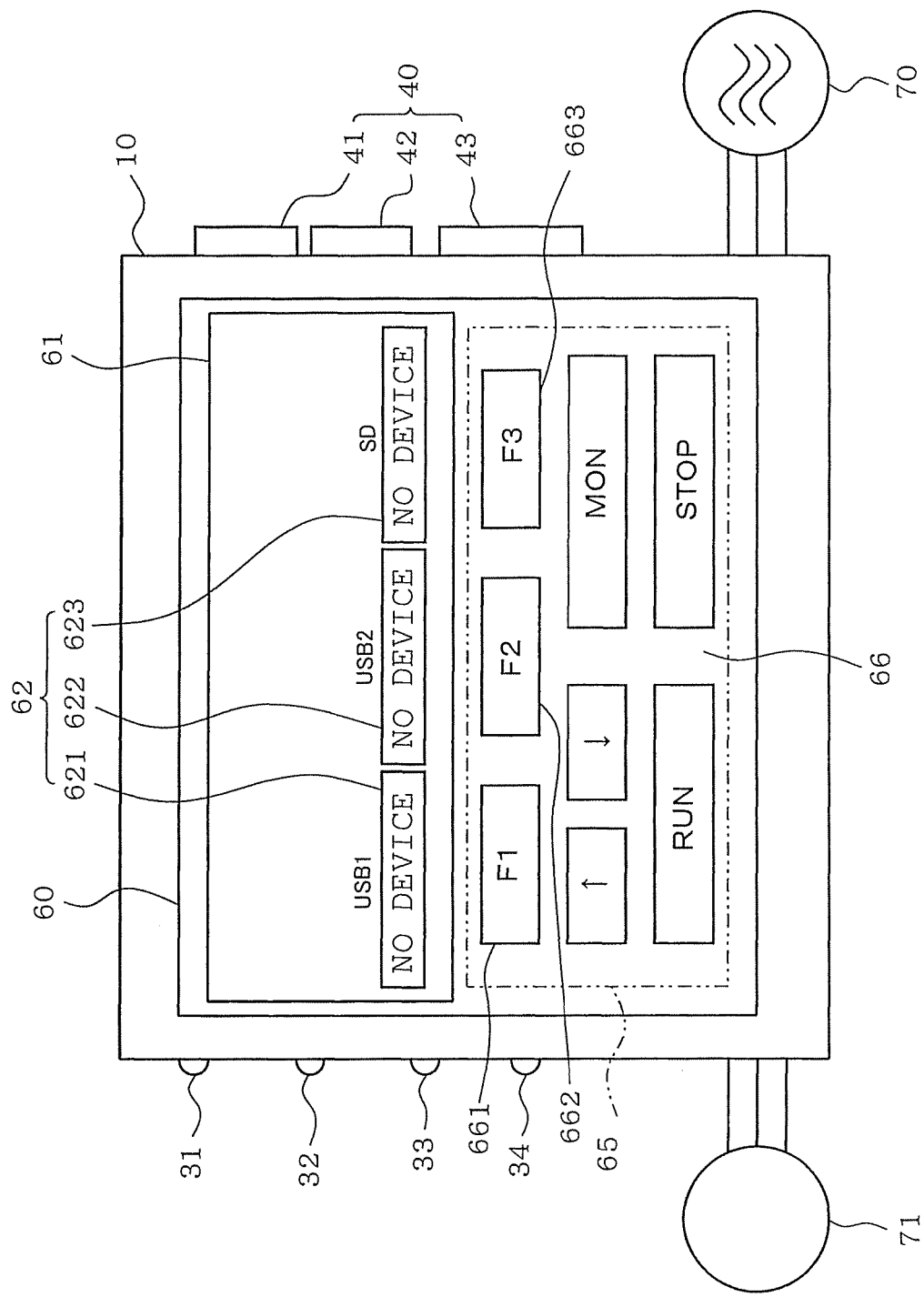
FIG. 2 illustrates an appearance of the inverter device.

For example, as shown in FIG. 2, an indication, "USB1" corresponding to the USB connector 41 is displayed on the display 61. An indication, "USB2" corresponding to the USB connector 42 is displayed on the display 61. An indication, "SD" corresponding to the SD connector 43 is displayed on the display 61. The status display areas 621, 622 and 623 are located below the indications "USB1," "USB2" and "SD" on the display 61 in order to display statuses of the external storage devices inserted in the connectors 41, 42 and 43, respectively. A status display area 62 will refer collectively to the status display areas 621, 622 and 623 in the following description.

Each external storage device has two statuses relative to the connector 40, that is, a "no device" state and an "inserted" state. The "no device" state refers to the external storage device which has not been inserted in the connector 40. When the connector 40 is in the "no device" state that the external storage device is not inserted in the connector 40, the control device 20 controls the display 61 so that the indication, "no device" is displayed on the state display area 62, as shown in FIG. 2.

Figure 3:
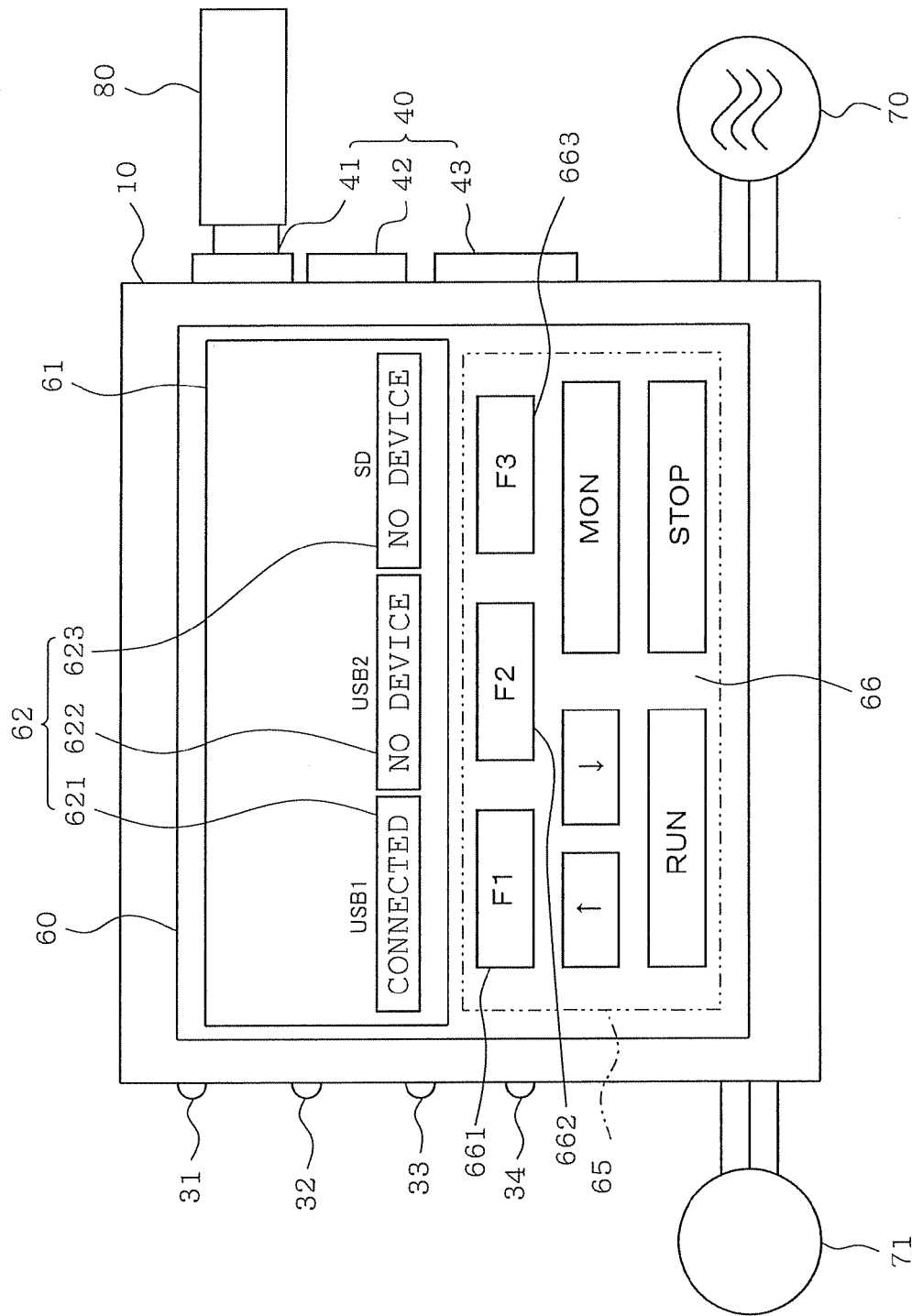
FIG. 3 illustrates an appearance of the inverter device in the case where an external storage device inserted in a connector and switched to a connected state.
Figure 4:
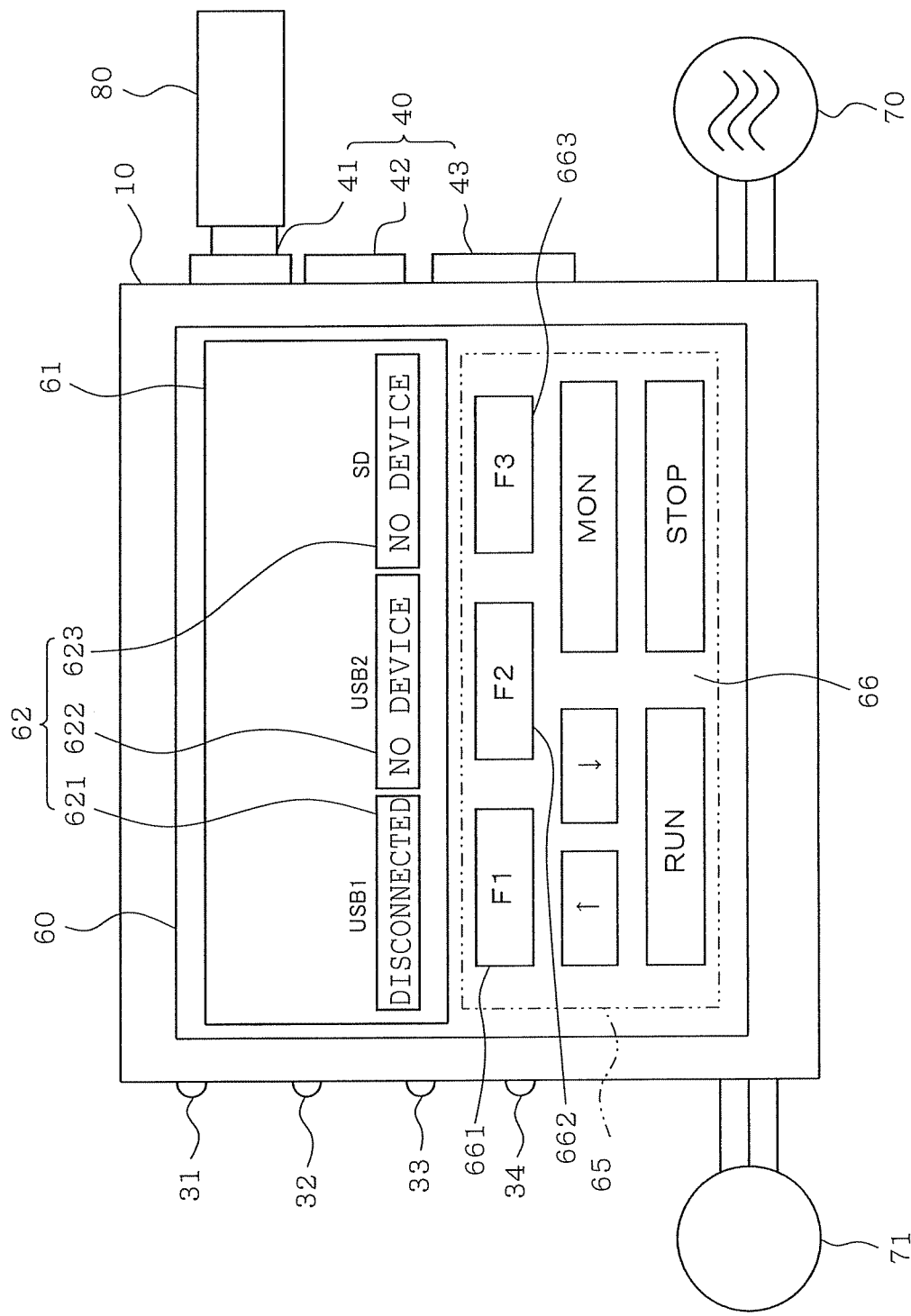
FIG. 4 illustrates an appearance of the inverter device in the case where the external storage device inserted in the connector and switched to a disconnected state.
Figure 5:
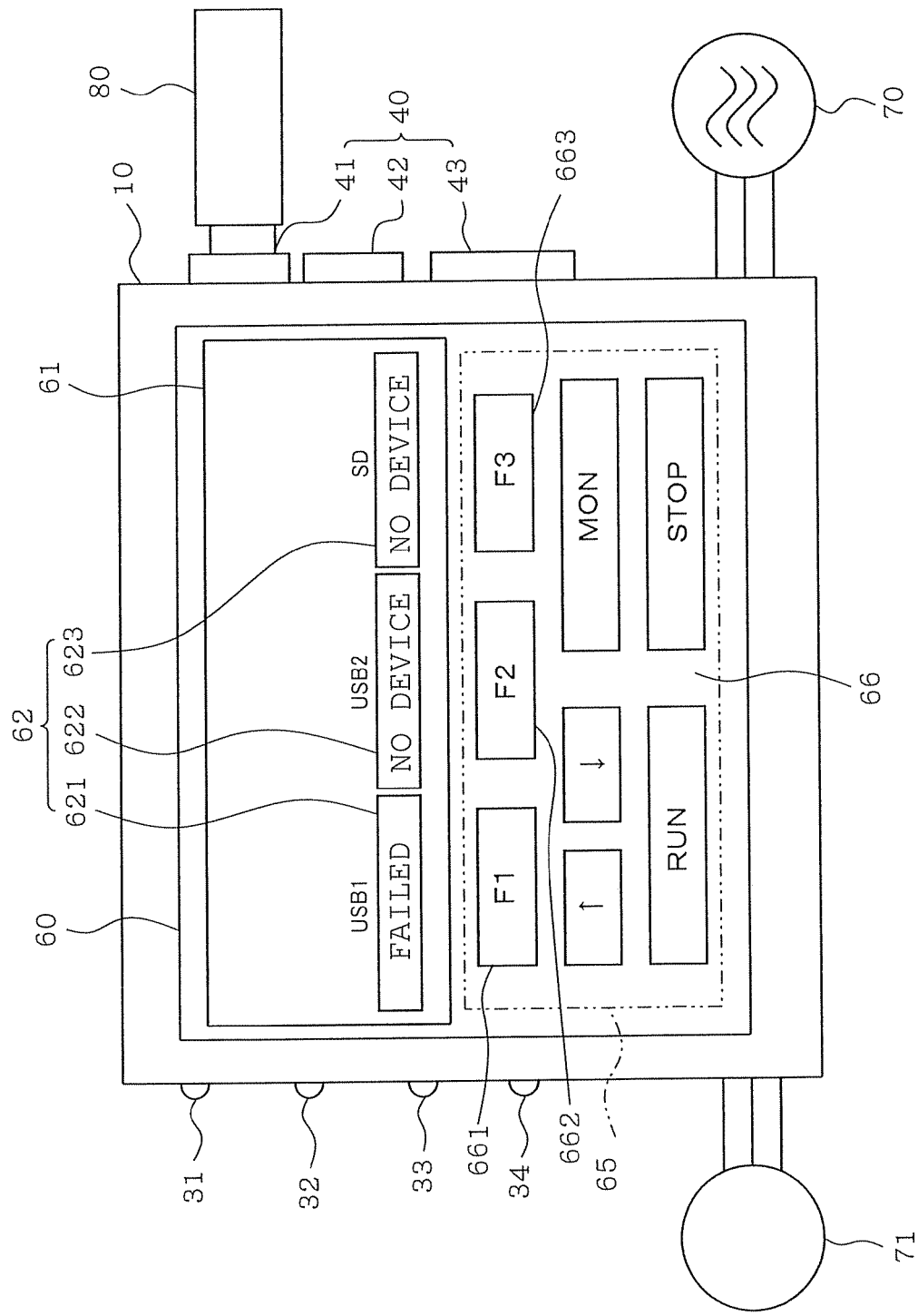
FIG. 5 illustrates an appearance of the inverter device in the case where the external storage device inserted in the connector and switched to a failed state.

The inserted state indicates a state of the external storage device 80 which has been inserted in the connector 40, as shown in FIGS. 3, 4 and 5. In the embodiment, the external storage unit 80 composed of a USB memory is shown as inserted in the USB connector 41 as an example. The inserted state is further classified into three states, that is, a "connected state," a "disconnected state" and a "failed state." In the connected state, the control device 20 and the external storage device 80 are capable of communicating to each other. When the external storage device 80 inserted in the connector 40 is in the connected state, the control device 20 controls the display 61 so that an indication, "connected" is displayed in the state display area 62 corresponding to the connector 40 in which the external storage device 80 is inserted, as shown in FIG. 3. In the embodiment, the indication, "connected" is displayed in the state display area 621 corresponding to the USB connector 41, whereupon the user can recognize that the external storage device 80 is inserted in the USB connecter 41 and that the external storage device 80 is connected.

When the external storage device 80 is in the connected state, the control device 20 is capable of reading and writing data from and to the external storage device 80. In this case, when the external storage device 80 is forcibly disconnected from the connecter 40, there is a possibility that data written to the external storage device 80 would be corrupted. In the embodiment, however, when confirming the indication of "connected" displayed in the state display area 62, the user can recognize that the external storage device 80 is not currently allowed to be disconnected. In this case, the displayed contents may have a higher degree of warning, such as "do not disconnect."

The disconnected state refers to a state where data read and write from and to the external storage device 80 by the control device 20 is stopped and the communication between the control device 20 and the external storage device 80 is stopped. When the external storage device 80 is in the disconnected state, the control device 20 is configured to control the display 61 so that the indication, "disconnected" is displayed in the state display area 62 corresponding to the connector 40 in which the external storage device 80 in the disconnected state is inserted, as shown in FIG. 4. In the embodiment, the control device 20 controls the display 61 so that the indication, "disconnected" is displayed in the state display area 621 corresponding to the connector 41. As a result, the user can recognize that the external storage device 80 inserted in the USB connector 41 is in the disconnected state.

Since the communication between the control device 20 and the external storage device 80 is stopped in the disconnected state, there is no possibility that data written to the external storage device 80 would not be corrupted even when the external storage device 80 is removed from the connector 40. Accordingly, the user can safely remove the external storage device 80 from the connector 40 when the external storage device 80 is in the disconnected state. When confirming the indication, "disconnected" displayed in the state display area 62, the user can recognize that the external storage device 80 can safely be removed from the connector 40. In this case, the displayed contents may be more direct, for example, "removable."

An indication, "failed" indicates that establishment of communication between the external storage device 80 and the communication circuit 23 has failed, for example, in the case where the communication circuit 23 does not comply with the standards of the external storage device 80 inserted in the connector 40. In the failed state, the control device 20 is unable to read and write data from and onto the external storage device 80. When the external storage device 80 is in the failed state, the control device 20 controls the display 61 so that the indication, "failed" is displayed in the state display area 62 corresponding to the connector 40 in which the external storage device 80 in the failed state has been inserted, as shown in FIG. 5. In the embodiment, the control device 20 controls the display 61 so that the indication, "failed" is displayed in the state display area 621 corresponding to the USB connector 41. As a result, the user can recognize that the external storage device 80 inserted in the connector 41 is unable to use for some reason. In this case, a plurality of indications of "device failed", "device non-compliant" and the like may be displayed instead of the single indication. The indication, "device failed" indicates that the inserted external storage device 80 has failed and the indication "device non-compliant" indicates that the external storage device is not matched with the communication circuit 23.

The operation portion 65 has a plurality of key switches 66 as shown in FIG. 2. Each key switch 66 receives an input from the user to transmit the operation contents to the control device 20. For example, indications corresponding to operation contents such as "run," "stop" and the like are printed on the respective key switches 66. The user can optionally allot operation contents to a key switch 611 printed with the indication, "F1," a key switch 662 printed with the indication, "F2" and a key switch 663 printed with the indication, "F3" of the key switches 66. In the embodiment, the key switch 661 corresponds to the connector 41 and is configured for input of disconnection operation for disconnecting the external storage device 20 inserted in the connector 41 from the control device 20. The key switch 662 corresponds to the connector 42 and is configured for input of disconnection operation for disconnecting the external storage device 20 inserted in the connector 42 from the control device 20. The key switch 663 corresponds to the connector 43 and is configured for input of disconnection operation for disconnecting the external storage device 20 inserted in the connector 43 from the control device 20.

For example, the control device 20 stops reading and writing data from and to the external storage device 80 when the key switch 661 corresponding to the USB connector 41 is depressed in the case where the external storage device 80 has been inserted in the USB connector 41 to be in the connected state. The control device 20 then stops communication with the external storage device 80, whereupon the external storage device 80 is in the disconnected state. As a result, the user is allowed to safely remove the external storage device 80 from the USB connector 41. In this case, the key switches 661, 662 and 633 function as input units.

The following will describe control contents relating to acquisition of logs inclusive of insertion and removal of the external storage device 80. The following description exemplifies a case where the external storage device 80 is inserted into and removed from the USB connector 41 of the connectors 40. The external storage device 80 is inserted into and removed from the USB connector 42 or the SD connector 43 in the same manner.

In the embodiment, a log designates information relating to an operational status of the inverter device 10. For example, the information includes output current, output voltage, output power, start and stop of the inverter device 10 and the contents set by the user. In this case, a log element d designates the contents per unit time composing the log. Furthermore, when a log element d (n) designates a log element d at a point in time, a log element d earlier than the log element d (n) or already generated log element d (n) is represented as log element d (n−1), d (n−2), . . . where n is any integer. A log element d later than the log element d (n) or a log element d that will occur in the future is represented as log element d (n+1),d (n+2) . . . where n is any integer.

A temporary log Dt is composed of a plurality of log elements d and temporarily saved on the internal storage device 50. More specifically, the temporary log Dt is composed of a plurality of log elements d stored in the internal storage device 50. A log D is also composed of a plurality of log elements d and stored in the external storage device 80. More specifically, the log D is composed of a plurality of log elements d stored on the external storage device 80. In this case, the log elements d composing the log D include the log elements d composing the temporary log Dt. Hence, the log D includes the collected log elements d with added temporary log Dt. The log elements d will be referred to as "log" when the log elements d, the preliminary log Dt and the log element Dt are not distinguished from one another.

Figure 6:
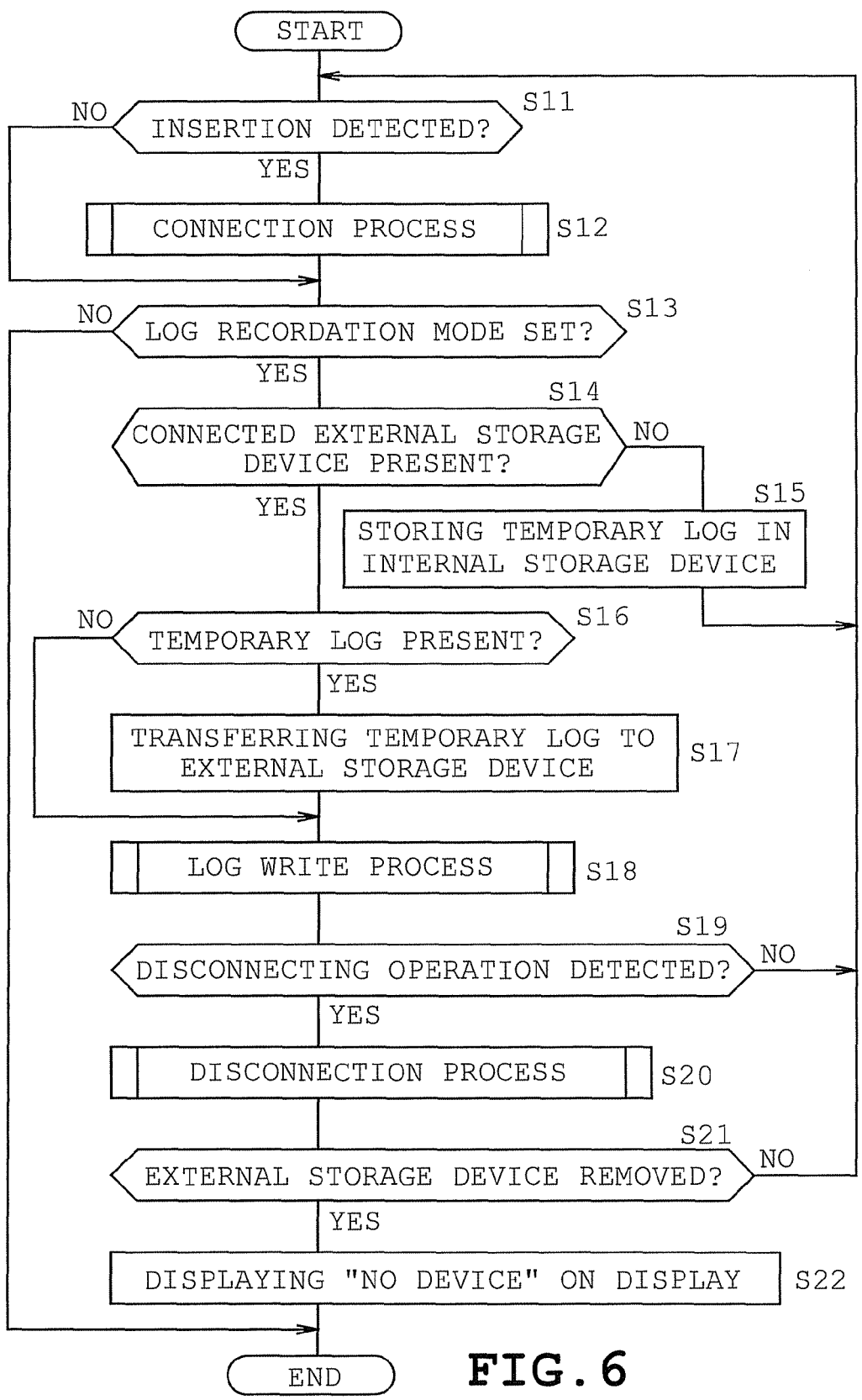
FIG. 6 is a flowchart showing control contents regarding log acquisition by a control device.

The control device 20 is configured to execute control relating to log acquisition as shown in FIG. 6 separately from the control of the motor 71 by the inverter main circuit 11. The control device 20 firstly determines whether or not the external storage device 80 has been inserted in the connector 40 (step S11). When no external storage device 80 has been inserted in the connector 40 (NO at step S11), the control device 20 proceeds to step S13. On the other hand, when detecting that the external storage device 80 has been inserted in the connector 40 (YES at step S11), the control device 20 proceeds to step S12 to execute a connection process.

Figure 7:
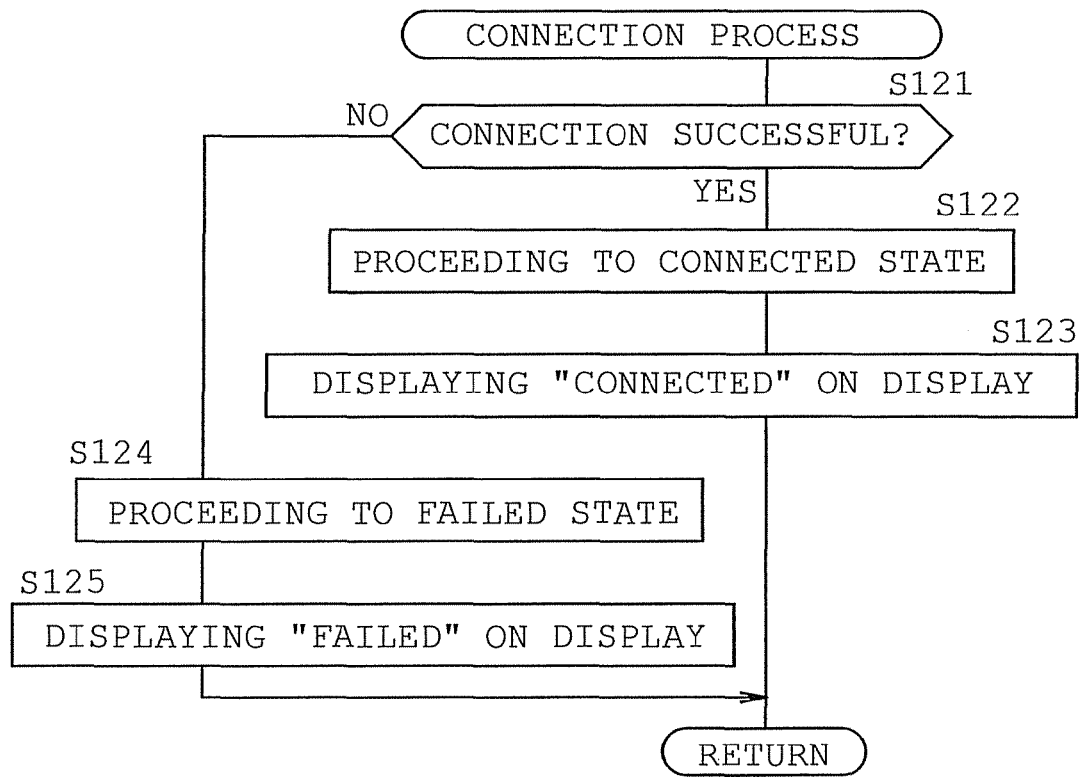
FIG. 7 is a flowchart showing control contents regarding a connection process.

Upon start of the connection process, the control device 20 attempts connection to and communication with the external storage device 80 at step S121 as shown in FIG. 7. When succeeding in connection to the external storage device 80 and establishing communication with the external storage device 80 (YES at step S121), the control device 20 proceeds to step S122 to switch the external storage device 80 to the connected state, whereby data, that is, log element d is allowed to be written to the external storage device 80. Subsequently, the control device 20 proceeds to step S123 to control the display 61 so that the indication, "connected" is displayed in the state display area 621 corresponding to the USB connector 41 in which the external storage device 80 is inserted, thereafter ending the connection process (RETURN).

Figure 10:
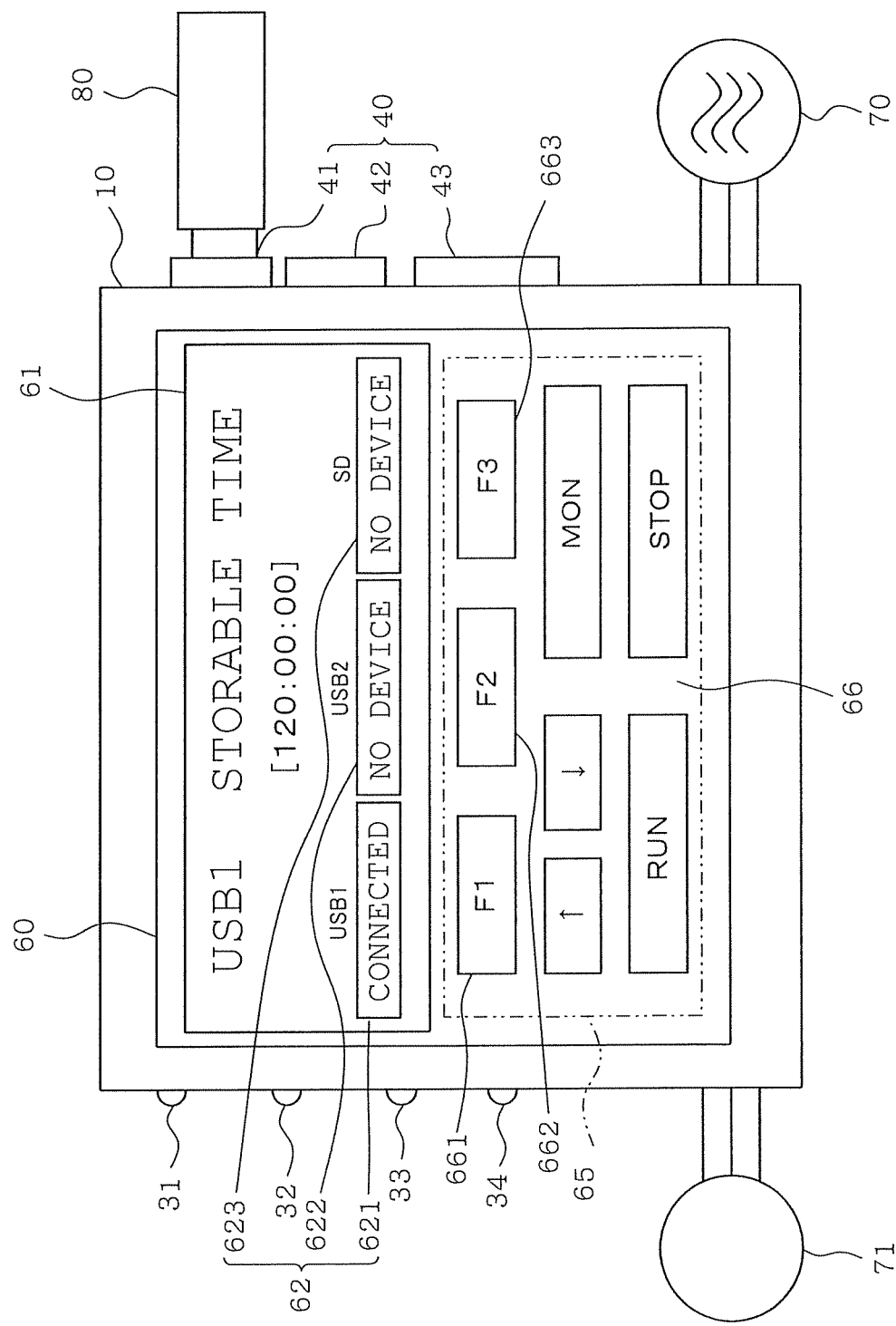
FIG. 10 illustrates an appearance of the inverter device with the display displaying a free space of the external storage device inserted in the connector.

In the foregoing case, the control device 20 converts a free space of the external storage device 80 in the connected state to a time for which the log D can be stored, controlling the display 61 to display the converted time on the display 61, as shown in FIG. 10. For example, FIG. 10 shows that the external storage device 80 inserted in the USB connector 41 has a free space capable of storing logs D corresponding to a period of 120 hours.

On the other hand, when having failed in the connection to the external storage device 80 (NO at step S121), the control device 20 proceeds to step S124 to switch the external storage device 80 to a failed state. Subsequently, the control device 20 proceeds to step S125 to control the display 61 to display the indication, "failed" in the state display area 621 corresponding to the USB connector 41 in which the external storage device 80 is inserted, thereafter ending the connection process (RETURN).

After execution of the connection process at step S12 in FIG. 6, the control device 20 proceeds to step S13 to determine whether or not a log recordation mode has been set. The log recordation mode relates to whether or not log D is recorded. The user operates the operation panel 60 to switch the log recordation mode between a set state and an unset state. When the log recordation mode is set, the control device 20 executes recordation of logs D. The log recordation is not executed when the log recordation mode is unset.

When the log recordation mode is unset (NO at step S13), the control device 20 determines that recordation of log D is unnecessary, thereby ending the control relating to log acquisition as shown in FIG. 6. On the other hand, when the log recordation mode has been set (YES at step S13), the control device 20 determines that recordation of log D is necessary, proceeding to step S14 and subsequent steps to record log D.

At step S14, the control device 20 determines whether a connected external storage device is present or absent. The control device 20 proceeds to step S15 when any connected external storage device is absent (NO at step S14). At step S15, the control device 20 writes and stores the log of the inverter device 10 as temporary log Dt to the internal storage device 50.

Figure 12:
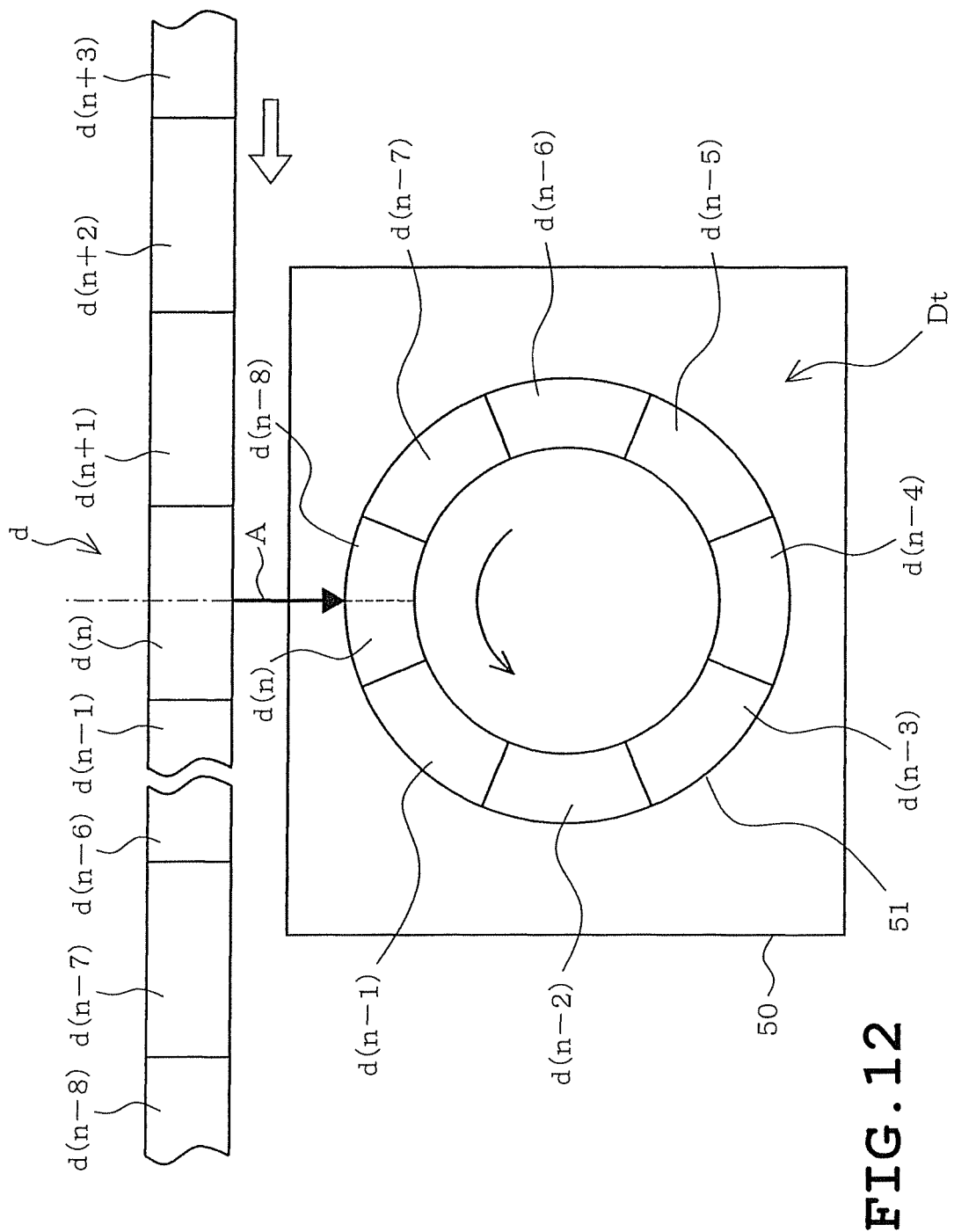
FIG. 12 is a conceptual illustration of a storage area of an internal storage device.

The internal storage device 50 has a storage area 51 set into a ring buffer as shown in FIG. 12. A plurality of band-shaped log elements d shown in FIG. 12 conceptually shows changes of the log element d with time, produced in the inverter device 10. In this case, when an arrow A in FIG. 12 is assumed to represent the current time, log elements located on the left of the arrow A are log elements d already produced in the past, whereas log elements d located on the right of arrow A are log elements d which will be produced in the future. A predetermined amount of log element is stored in the storage area 51 of the internal storage device 50 on the basis of the present log element d (n). A temporary log Dt is composed of the predetermined amount of log d.

In the above-described case, when the storage area 51 is capable of storing eight log elements d, the control device 20 sequentially writes latest log elements d into the storage area 51 until eight log elements d are stored in the storage area 51 in an empty state. When the storage area 51 has become full of data, the control device 20 sequentially replaces the earliest log element d stored in the storage area 51 or the log element (n−8) in this case with the latest log element d presently produced as shown by arrow A in FIG. 12, thereby storing the latest log element d (n) in the internal storage device 50. Thus, a temporary log Dt is composed of a block of early log elements d traced back by a predetermined time from the present log element d (n).

The control device 20 is configured to repeat steps S11 to S15 until the external storage device 80 is inserted into the connector 40 to be into the connected state. Accordingly, the temporary log Dt is composed of a set of log elements d produced in the period traced back by the predetermined period from the current time, which period is a period starting from an initial detection of the log recordation mode (YES at step S13 in FIG. 6) and ending at detection of the external storage device 80 in the connected state (YES at step S14 in FIG. 6)

The control device 20 proceeds to step S16 when the external storage device 80 in the connected state is present (YES at step S14). In this case, the control device 20 proceeds to step S16 when the external storage device 80 has been inserted in at least any one of the connectors 41, 42 and 43 into the connected state. In the embodiment, the control device 20 proceeds to step S16 when the external storage device 80 inserted in the USB connector 41 is in the connected state (YES at step S14).

At step S16, the control device 20 determines whether or not the temporary log Dt has been stored in the internal storage device 50. When the temporary log Dt is stored in the internal storage device 50 (YES at step S16), the control device 20 proceeds to step S17 to transfer the temporary log Dt stored in the internal storage device 50 to the external storage device 80 in the connected state. As a result, the past log D produced before the external storage device 80 is switched to the connected state is stored on the external storage device 20. Thereafter, the control device 20 further proceeds to step S18. On the other hand, when a temporary log Dt is not stored on the internal storage device 50 (NO at step S16), the control device 20 proceeds via step S17 to step S18.

In step S18, the control device 20 executes log write onto the external storage device 80 in the connected state, storing the log D in the external storage device 80. The control device 20 sequentially writes log elements d to the external storage device 80. In this case, the control device 20 is configured to manage a plurality of log elements d, for example, ten successive log elements d which are collected on the basis of a predetermined time or amount into a unit log F, as shown in FIGS. 13A and 13B. The unit log F is a minimum unit that data management including deletion and data movement can be executed with respect to the unit log F. More specifically, the user can move and delete the log D every unit log F when the log D is to be obtained by the external storage unit 80. Unit logs F are assigned with different file names. In this case, the log D stored in the external storage device is composed of at least one unit log F.

The user sets a maximum amount of the unit log based on, for example, time, day, week, month, year and the like. For example, when the maximum amount of data is set in the unit of one hour, a maximum amount of data of unit log F is set to a capacity sufficient to store log D acquired for one hour. In the similar manner, when the maximum amount of data is set in the unit of one week, a maximum amount of data of unit log F is set to a capacity sufficient to store log D acquired for a week. A file name of each unit log F is determined according to the setting of the unit log F. For example, the file name is determined on the basis of the starting time of the log D, day, month, year and the like. The latest unit log is employed as the unit log F (X), and the unit log (F) becomes older in the order of F(X−1), F(X−2) and (X−3).

Figure 8:
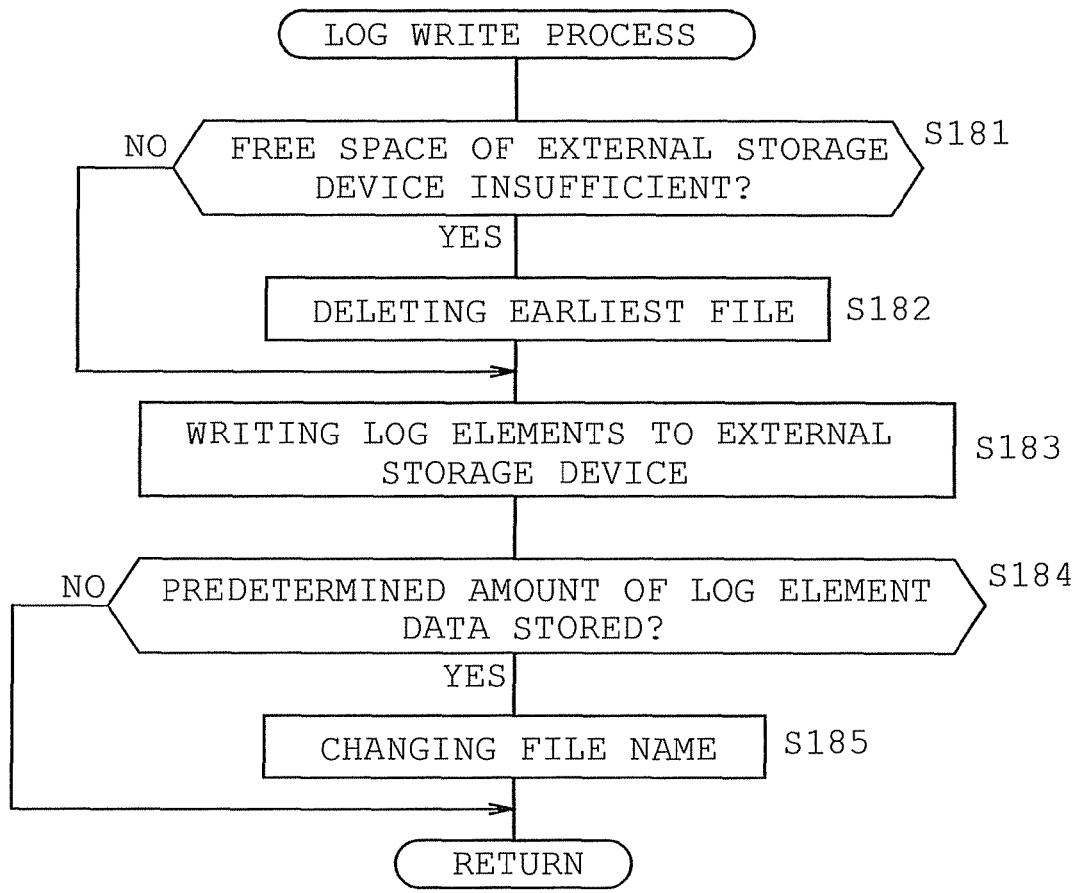
FIG. 8 is a flowchart showing control contents regarding a log writing process.

Upon execution of a log write process at step S18 in FIG. 6, the control device 20 firstly determines, at step S181, whether or not a free space of the external storage device 80 is insufficient, as shown in FIG. 8. When the free space is equal to or larger than a maximum amount of data of the unit log F, the control device 20 determines that the free space is sufficient (NO at step S181), proceeding to step S183. When the free space is smaller than the maximum amount of data of the unit log F, the control device 20 determines that the free space is insufficient (YES at step S181), proceeding to step S182. At step S182, the control device 20 deletes the earliest unit log F (X−3) thereby to ensure a free space to which the newest unit log F (X) is written, as shown in FIG. 13A. The control device 20 then proceeds to step S183 to write the log elements d onto the external storage device 80. Subsequently, the control device 20 proceeds to step S184 to determine whether or not a predetermined amount of log element d is stored. When the predetermined amount of log element d is stored, for example, when ten log elements d are stored and the unit log F (X) is composed, the control device 20 determined in the affirmative (YES) at step S184, proceeding to step S185, as shown in FIG. 13B.

Figure 11:
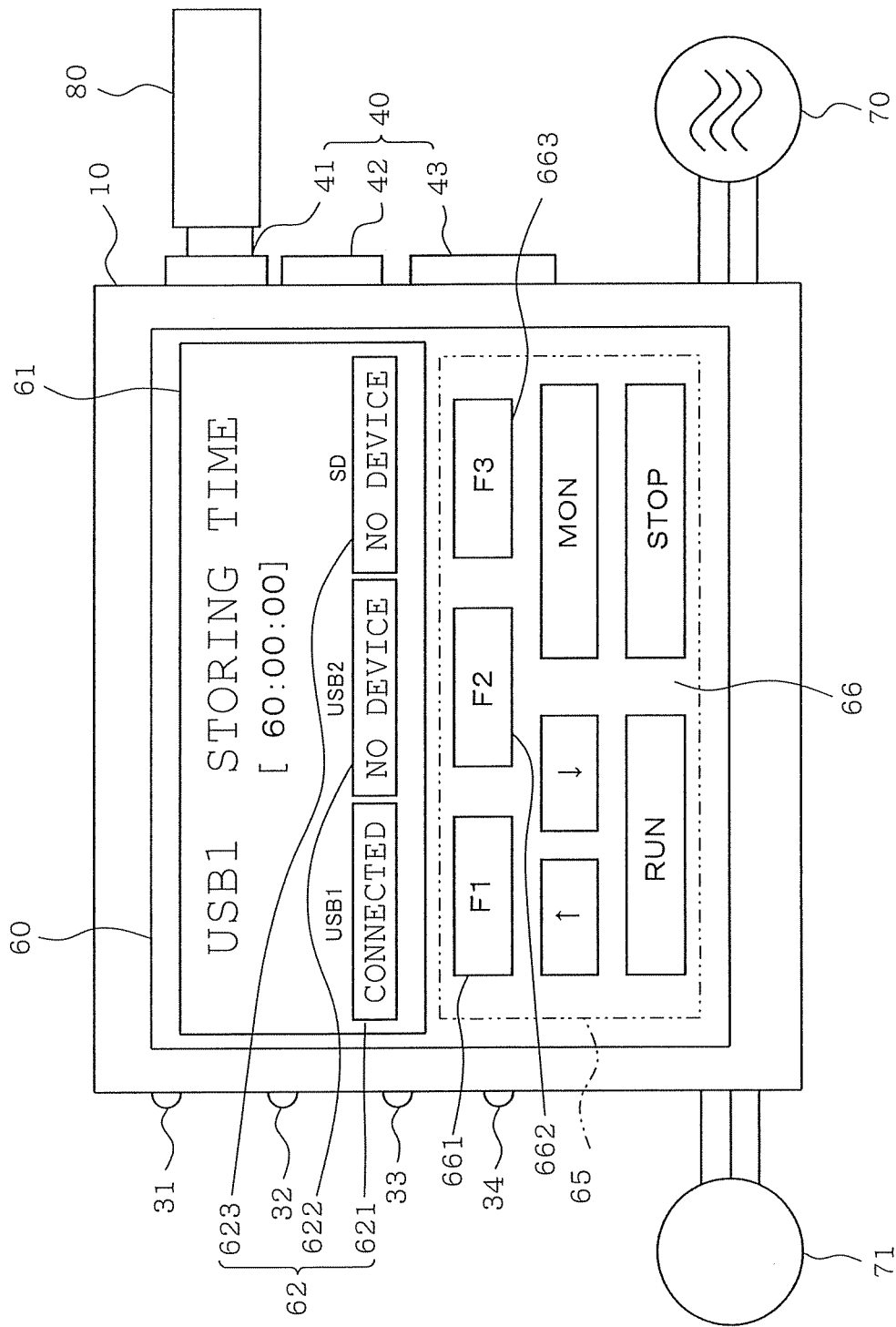
FIG. 11 illustrates an appearance of the inverter device with the display displaying an amount of log stored in the external storage device.

At step S185, the control device 20 changes the file name of unit log F (X) to a subsequent unit log F (X+1), whereby log elements d are sequentially stored to be composed into the subsequent unit log F (X+1). On the other hand, when an amount of log element d has not reached the predetermined amount to compose the unit log F (X), the control device 20 determines in the negative at step S184, proceeding to step S19 (RETURN) in FIG. 6 without changing the file name at step S185. In this case, the control device 20 converts an amount of log D written to the external storage device 80 in terms of time, displaying a result of conversion on the display 61. For example, FIG. 11 shows that the external storage device 80 inserted in the USB connector 41 stores the log D whose amount corresponds to a period of sixty hours. When the user operates key switches 66 printed with "↑" and "↓", displayed contents can be switched between a free space of the external storage device 80 as shown in FIG. 10 and storage time as shown in FIG. 11.

Logs are written in a predetermined order of priority when a plurality of external storage devices is connected. For example, priority is set to the order of the USB connector 41, the USB connector 42 and the USB connector 43. When external storage devices are inserted in the connectors 41, 42 and 43 thereby to be each in a connected state, respectively, the control device 20 preferentially writes a log to the external storage device inserted in the connector 41.

The control device 20 subsequently proceeds to step S19 to determine whether or not the user has operated the key switch 66 for a disconnecting operation. When detecting no disconnecting operation (NO at step S19), the control device 20 proceeds to step S11 to repeat steps S11 to S19 until the log recordation mode is set to "unset" (NO at step S13) or until a disconnecting operation has been detected (YES at step S19).

Figure 9:
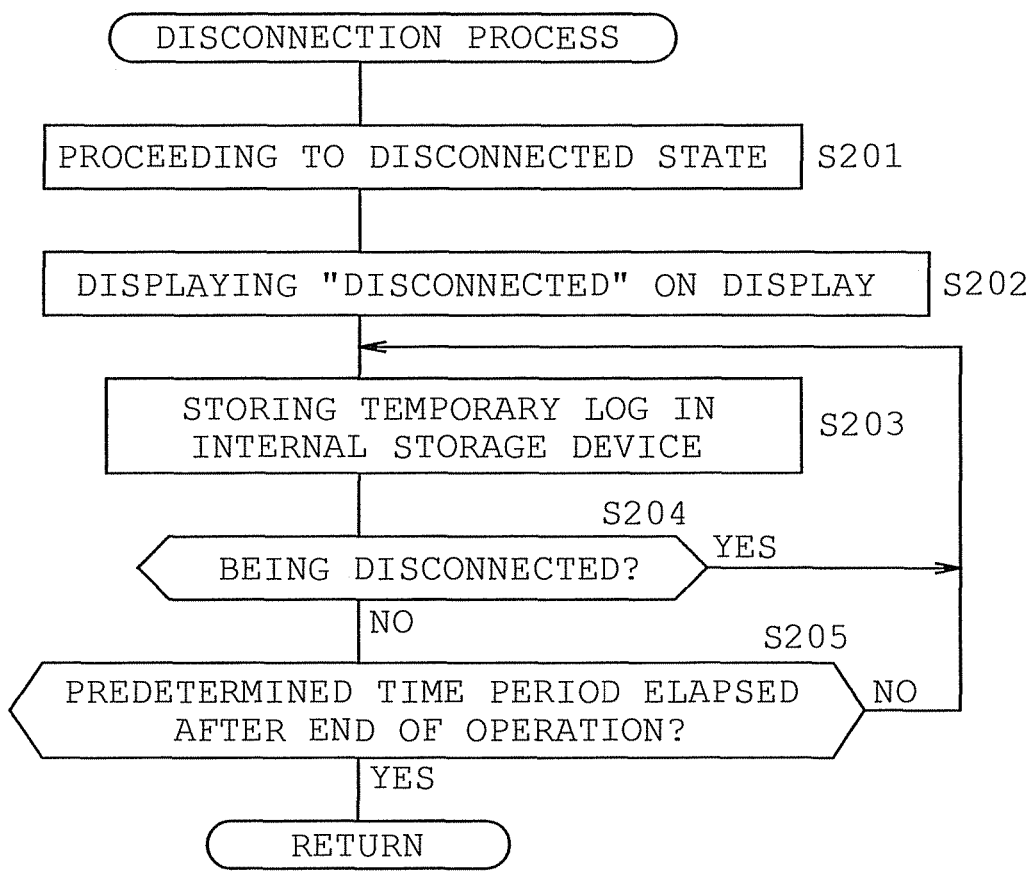
FIG. 9 is a flowchart showing control contents regarding a disconnection process.

When detecting a disconnecting operation (YES at step S19) while repeating steps S11 to S19 to write the log element d to the external storage device 80 at step S18, the control device 20 proceeds to step S20 to execute the disconnection process. In the embodiment, when receiving an input operation of the key switch 661 (YES at step S19), the control device 20 determines that the disconnecting operation has been executed with respect to the external storage device 80 inserted in the USB connector 41, proceeding to step S20. Upon execution of the disconnection process, the control device 20 stops, at step S201, writing the log element d to the external storage device 80 and further stops communication with the external storage device 80, as shown in FIG. 9. As a result, the external storage device 80 is switched to the disconnected state. The control device 20 then proceeds to step S202 to control the display 61 so that the indication of "disconnected" is displayed in the status display area 621 corresponding to the USB connector 41 into which the external storage device 80 is inserted.

The control device 20 subsequently proceeds to step S203 to write a log element d to the internal storage device 50 and to store a temporary log Dt into the internal storage device 50. The control device 20 then proceeds to step S204 to determine whether or not the disconnecting operation by the user is continuing. The control device 20 further proceeds to step S205 to determine whether or not a predetermined period of time, for example, ten seconds, has elapsed after start of the disconnecting operation at step S205. The predetermined period of time starts after execution of the disconnecting operation or after the input operation of the key switch 66. The predetermined time period may start immediately after an input operation by the user or immediately after the key switch 66 has received the input operation. Alternatively, the predetermined time period may start immediately after the user has ended the input operation or immediately after the key switch 66 has been released from the input operation.

The control device 20 repeats steps S203 to S205 to maintain the external storage device 80 in the disconnected state when the disconnecting operation is going on with the key switch 661 having been depressed (YES at step S204) or when the predetermined period of time has not elapsed after depression of the key switch 661 (NO at step S205). On the other hand, the control device ends the disconnection process (RETURN) when the disconnecting operation is not going on with the key switch 661 having not been depressed (NO at step S204) and the predetermined time period has elapsed after depression of the key switch 661 (YES at step S205). The control device 20 then proceeds to step S21 in FIG. 6.

At step S21, the control device 20 determines whether or not the external storage device 80 has been removed from the USB connector 41. When the external storage device 80 has not been removed (NO at step S21), the control device 20 proceeds to step S11 to repeat steps S11 to S21 thereby to restart recordation of the log D. On the other hand, when the external storage device 80 has been removed (YES at step S21), the control device 20 proceeds to step S22 to control the display 61 so that the indication of "no device" is displayed in the status display area 621 of the display 61, thereafter ending the control relating to log acquisition, as shown in FIG. 2.

According to the above-described control manner, the control device 20 switches the external storage device 80 to the connected state in which the log element d can be written to the external storage device 80. When the external storage device 80 is inserted into the connector 40 to be switched to the connected state and the key switch 66 corresponding to the connector 40 in which the external storage device 80 has been inserted, the control device 20 stops writing the log element d to the external storage device 80 and switches the external storage device 80 to the disconnected state in which the external storage device 80 is removable from the connector 40. Consequently, the user can write the log element d to the external storage device 80 and acquire the log D when the external storage device 80 is inserted into the connector 40 under the log recordation mode.

Furthermore, when a USB memory is removed from a general personal computer, the user operates an interface such as a mouse to stop writing data to the external storage device 80 while viewing a screen associated with the personal computer, whereby the USB memory is safely removable from the personal computer. On the other hand, in the embodiment, the user operates the key switch 66 to switch the external storage device 80 to the disconnected state, whereby the external storage device 80 is safely removable from the connector 40. Consequently, the user can acquire the log D by inserting and removing the external storage device 80 into and from the connector 40 by an easier operation as compared with the case of the conventional personal computer.

The control device 20 switches the external storage device 80 inserted in the connector 40 into the disconnected state while the key switch 66 is receiving the input operation as shown at step S204 in FIG. 9 and during the predetermined period of time after the user has carried out the input operation to the key switch 66 as shown at step S205 in FIG. 9. Subsequently, when the external storage device 80 has not been removed from the connector 40 as shown at step S21 in FIG. 6, the control device 20 restarts acquisition of log D. According to this, the acquisition of log D is automatically restarted even when the key switch 66 is erroneously touched by the user for the disconnecting operation. This can reduce failure in the recordation of log D due to erroneous operation of the key switch 66.

The operating portion 65 includes the key switches 66. The user is allowed to assign a function as the input unit used for the disconnecting operation to any one of the key switches 66. According to this, the convenience of the inverter device can be improved since the disconnecting operation is assigned to one of the key switches 66, which one key switch 66 is easy for the user to operate. More specifically, the user can use the key switch 66 conventionally provided in the inverter device, as the input unit for the disconnecting operation. This requires no interface dedicated to the disconnecting operation and can accordingly suppress an increase in the size of the inverter device 10.

A predetermined disconnecting operation may be assigned to the plural key switches. For example, two key switches 66 printed with indications "F1" and "↓" may be simultaneously operated for disconnecting operation. Consequently, an erroneous operation by the user can be reduced more effectively as compared with the case where a single key switch 66 is operated.

The inverter device 10 includes the connector 40 and the display 61 displaying the status of the external storage device 80 inserted in the connector 40 or one of the connectors 41 to 43. In this case, the control device 20 controls the display 61 so that the external storage device 80 inserted in one of the connectors 41 to 43 is displayed on the display 61 in such a manner that one of the connector 41 to 43 in which the external storage device 80 is inserted can be distinguished from the other connectors and that the state of the external storage device 80 can be specified. When the external storage device 80 is in the connected state, the control device 20 controls the display 61 so that the indication, "connected" is displayed in the status display area 62 of the display 61. When the external storage device 80 is in the disconnected state, the indication, "disconnected" is displayed. When the external storage device 80 is in the failed state, the indication, "failed" is displayed. Furthermore, when no external storage device 80 is inserted in the connector 40, the indication, "no device" is displayed in the status display area 62 of the display 61. According to this, when viewing the display 61, the user can understand the connector 40 in which the external storage device 80 is inserted and the state of the external storage device 80. Consequently, the user can easily obtain the log D by inserting the external storage device 80 into the connector 40.

The inverter device 10 includes the internal storage device 50 for storing the temporary log Dt. The control device 20 repeats steps S11 to S19 in FIG. 6 thereby to write the log elements d to the external storage device 80, that is, to accumulate logs D. When detecting the disconnecting operation and executing the disconnection process at step S20 during accumulation of logs D, the control device 20 repeats step S203 in FIG. 9 while the external storage device 80 is in the disconnected state. As a result, the control device 20 stores, as temporary log Dt, the log elements d produced during the disconnected state of the external storage device 80 on the internal storage device 50. Subsequently, when the external storage device 80 is again switched to the connected state, the control device 20 writes to the external storage device 80 the temporary log Dt stored on the internal storage device 50. According to this, the log D produced during the disconnected state can be stored in the external storage device 80 even when the user erroneously touches the key switch 66 with the result that the disconnecting operation is executed. This can improve the convenience of the log acquisition.

The internal storage device 50 has the storage area 51 set into the ring buffer. When no external storage device 80 in the connected state is present, the control device 20 accumulates the log elements d in the storage area 51 of the internal storage device 50 thereby to store the log elements d as the temporary log Dt. When the external storage device 80 is thereafter inserted into the connector 40 thereby to be switched to the connected state, the control device 20 transfers the temporary log Dt stored in the internal storage device 50 to the external storage device 80. According to this, the log D produced before the external storage device 80 is inserted into the connector 40 can be acquired.

After the external storage device 80 has been inserted into the connector 40 thereby to be switched to the connected state, the control device 20 transfers temporary log Dt to the external storage device 80 and writes log elements d to the external storage device 80, whereby the log D is stored in the external storage device 80. According to this, acquisition of log D from the external storage device 80 starts just when the user inserts the external storage device 80 into the connector 40. Accordingly, the user can store the log D in the external storage device 80 and change the external storage device 80 to another without having knowledge about procedures for log acquisition and change of the external storage device 80. This can further simplify the operation by the user.

The control device 20 is configured to convert a free space of the external storage device 80 in the connected state into the time during which log D can be stored. The control device 20 is further configured to convert already stored log D into the time and to display the time on the display. According to this, since the user can sensuously understand an amount of log D by the concept of time, with the result of further improvement in the convenience of the log acquisition.

Figure 14:
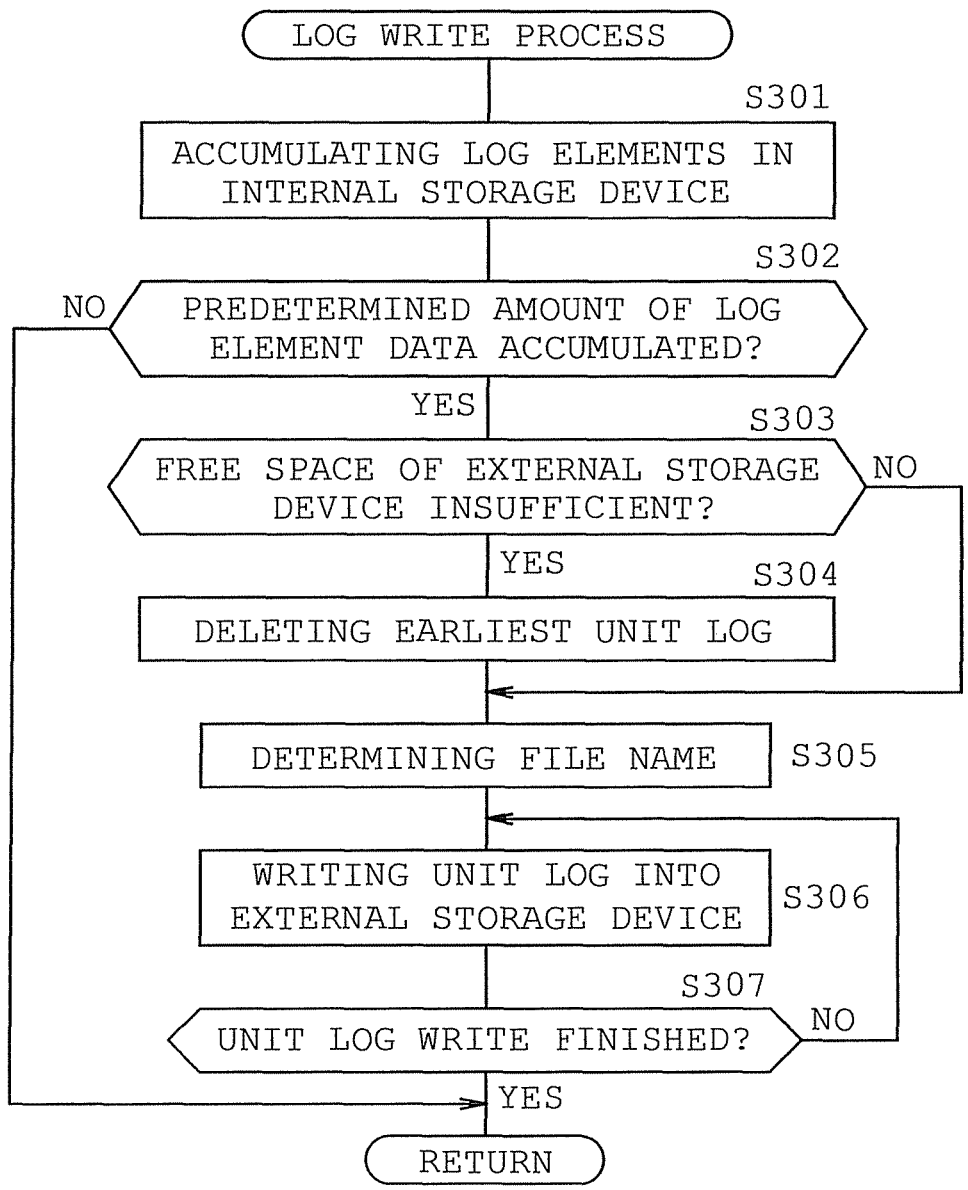
FIG. 14 is a view similar to FIG. 8, showing a second embodiment.

FIG. 14 illustrates a second embodiment. The second embodiment differs from the first embodiment in the log write process as shown at step S18 in FIG. 6. More specifically, in the first embodiment, the control device 20 directly writes log elements d into the external storage device 80, whereby log D is stored in the external storage device 80, as shown at step S183 in FIG. 8. On the contrary, in the second embodiment, the control device 20 once accumulates log elements d in the internal storage device 50 to compose unit log F. The control device 20 thereafter writes the unit log F to the external storage device 80, whereby log D is stored. In this case, the log D is composed of at least one unit log F.

More specifically, upon start of the log write process at step S18 in FIG. 6, the control device 20 writes log elements d to the internal storage device 50 at step S301 in FIG. 14. Subsequently, the control device 20 proceeds to step S302 to determine an amount of data of log elements d accumulated in the internal storage device 50. When data of the log elements d has not reached a predetermined amount and no unit log F (X) has been composed, the control device 20 determines in the negative (NO at step S302), proceeding (returning) to step S19 in FIG. 6. On the other hand, when data of the log elements d has reached the predetermined amount thereby to be composed into unit log F (X), the control device 20 determines in the affirmative (YES at step S302), proceeding to step S303.

At step S303, the control device 20 determines a free space of the external storage device 80 in the connected state. When the free space of the external storage device 80 is equal to or larger than a data amount of unit log F (X), the control device 20 determines in the negative (NO at step S303) or that the free space of the external storage device 80 is sufficient, proceeding to step S305. On the other hand, when the free space of the external storage device 80 is smaller than a data amount of unit log F (X), the control device 20 determines in the affirmative (YES at step S303) or that the free space of the external storage device 80 is insufficient, proceeding to step S304.

At step S304, the control device 20 deletes the oldest unit log F (X−3) shown in FIG. 13A in the same manner as at the step S182 in FIG. 8 thereby to secure a free space into which the latest unit log F(X) is to be written. Subsequently, the control device 20 proceeds to step S305 to determine a file name of the unit log F (X) based on the acquisition start time, day, month and year of the unit log F(X) and the like. The control device 20 then proceeds to step S306 to write the latest unit log F (X) stored in the internal storage device 50 into the external storage device 80 in the connected state. The control device 20 repeats steps S306 and S307 to continue writing the entire unit log F(X), thereafter finishing the writing (NO at step S307). The control device 20 proceeds (returns) to step S19 in FIG. 6 upon completion of writing the unit log F(X) to the external storage device 80.

While repeating steps S306 and S307, the control device 20 receives the disconnecting operation by the key switch 66 but defers execution of the disconnection process on the basis of the disconnecting operation, thereby prioritizing the writing of the unit log F to the external storage device 80. More specifically, when the disconnecting operation has been entered by the key switch 66 while the control device 20 is writing the unit log F to the external storage device 80 at steps S306 and S307, the control device 20 completes ongoing writing of the unit log F into the external storage device 80, thereafter proceeding (returning) via step S19 in FIG. 6 to step S20 to set the external storage device 80 to the disconnected state.

A plurality of unit logs F stored in the internal storage device 50 may be transferred to the external storage device 80 at a time. In this case, the user can optionally set the frequency at which the unit log F is written to the external storage device 80, for example, once per hour, once per day or once per week, irrespective of an amount of data of unit log F. According to this, the second embodiment can achieve the same advantageous effect as the first embodiment. Furthermore, the control device 20 writes the log elements d to the internal storage device 50 to compose the unit log F. Thereafter, the control device 20 transfers the unit log F from the internal storage device 50 to the external storage device 80. This can reduce the frequency at which data is written into the external storage device 80. More specifically, a time period for which log is being written to the external storage device 80 can be reduced as much as possible. Accordingly, even when the user erroneously removes the external storage device 80 in the connected state from the connector 40 without the disconnecting operation, breakage of the log during write can be reduced since the possibility that the log is being written to the external storage device 80 when the storage device has been removed from the connector 40.

When the disconnecting operation is executed during write of the unit log F to the external storage device 80 in the connected state, the external storage device 80 is controlled so as to complete the ongoing write of unit log F to the external storage device 80 and so as to be thereafter switched to the disconnected state. According to this, the user can carry out the disconnecting operation without minding whether unit log F is being written to the external storage device 80. This can render the disconnecting operation easier, thereby improving the convenience of the log acquisition.

Figure 15:
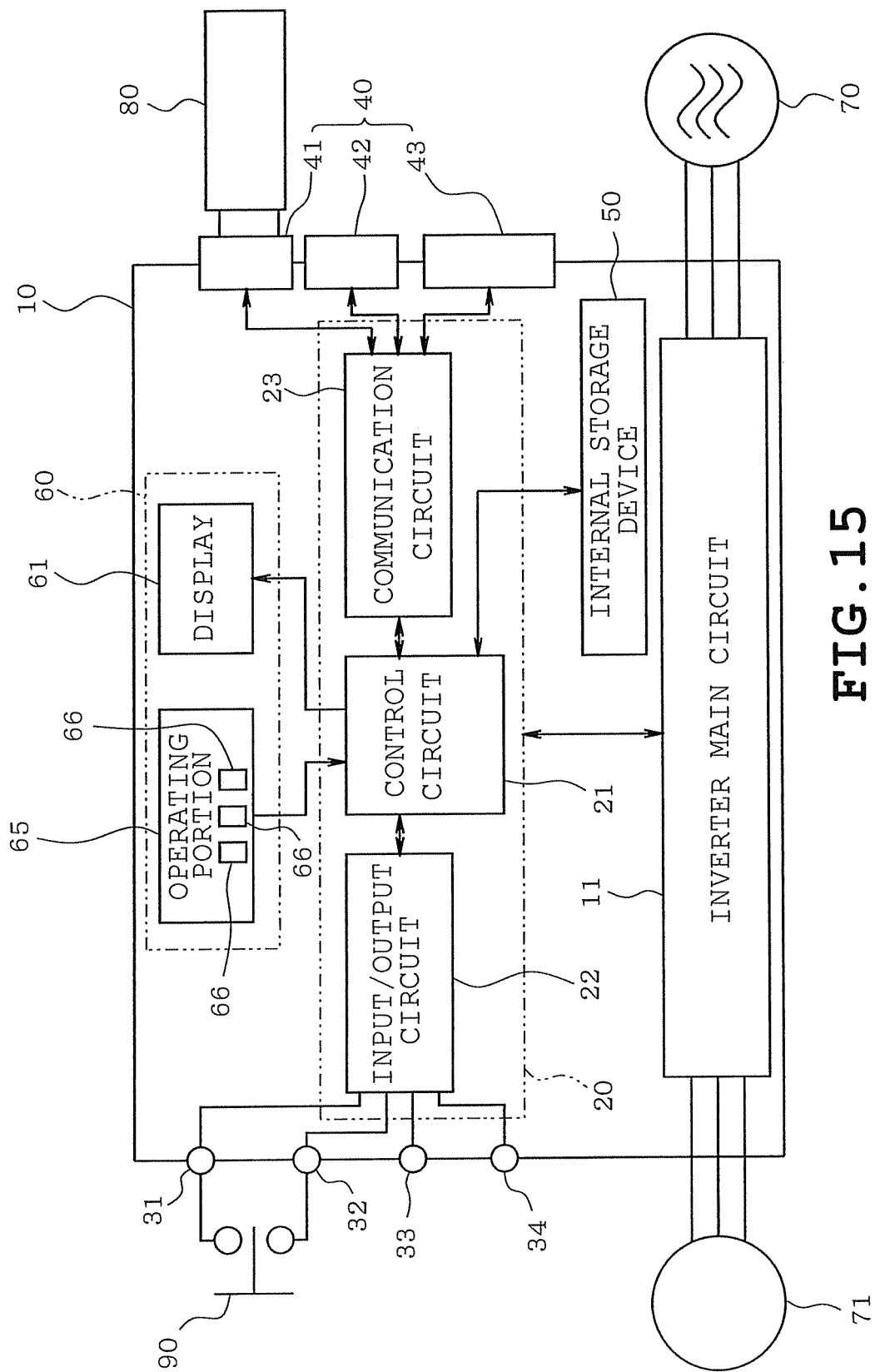
FIG. 15 is a view similar to FIG. 1, showing a third embodiment.

FIG. 15 illustrates a third embodiment. An external device 90 such as a push-button switch is connected to the input terminals 31 and 32 in the third embodiment. The input terminals 31 and 32 are configured to receive an input operation by the user via the external device 90. More specifically, when the user depresses the external device 90, an input signal is transmitted via the input/output circuit 22 to the control circuit 21. In this case, the input terminals 31 and 32 are appropriated for input of the disconnecting operation of disconnecting the external storage device 80 communicatively connected to the control device 20 via connector 40. More specifically, when the external storage device 80 inserted in the connector 40 is in the connected state, the user can switch the external storage device 80 to the disconnected state by operating the external device 90. As a result, the user can safely remove the external storage device 80 from the connector 40. In this case, the input terminals 31 and 32 to which the external device 90 is connected serves as an input unit. Additionally, three or more switches may be provided as the input unit. In this case, the input terminals connected to the external device 90 serves as an input unit.

According to the above-described configuration, the third embodiment can achieve the same advantageous effect as the first and second embodiments. Furthermore, the distance between the input terminals 31 and 32 and an operation portion of the external device 90 can easily be increased. Accordingly, even when the operation panel 60 is difficult to operate depending upon an installation location of the inverter device 10, the external device 90 can be disposed at a location where it is easy to operate, by drawing the external device 90 around. Consequently, the user can easily carry out the disconnecting operation for the external storage device 80 with the result of an improvement in the convenience of log acquisition.

The external device 90 should not be limited to the switch but may be a higher-level device of the inverter device 10. Furthermore, the determination relating to presence or absence of the disconnecting operation at step S19 in FIG. 6 may be executed by an interrupt control. For example, when the input unit such as the key switch 66 or the input terminals 31 and 32 receives an input operation, the disconnection process may be executed by the interrupt control at step S20.

In each of the above-described embodiments, the internal storage device 50 may be a hard disc drive incorporated in the inverter device 10 or a non-volatile memory provided in the control circuit 21. Furthermore, the external storage device 80 should not be limited to a flash memory such as the USB memory and the SD memory but may be a hard disc drive having a USB connection.

According to the above-described embodiments, the inverter device includes the connector into which a hot-pluggable external storage device is inserted. When the external storage device is inserted in the connector, the control unit switches the external storage device to the connected state in which logs are allowed to be written into the external storage device. Furthermore, when the input unit receives the input operation during the connected state of the external storage device, the control unit stops writing logs to the external storage device and switches the external storage device to a disconnected state in which the external storage device is removable from the connector. This allows the user to acquire logs by a simple operation.

The external storage device can be switched to the disconnected state when the user has operated the input unit. Accordingly, the external storage device can safely be removed from the connector. Consequently, the user can acquire logs by an easy operation.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An inverter device comprising:
   an inverter main circuit to which a load is connectable;
   an input unit which is configured to receive an input operation by a user;
   a connector into which a hot-pluggable external storage device is insertable; and
   a control unit which is configured to control writing of a log to the external storage device inserted in the connector, the log being pertinent to operating conditions of the load,
   wherein when the external storage device is inserted in the connector, the control unit switches the external storage device to a connected state in which the log is allowed to be written to the external storage device, and when the input unit receives the input operation during the connected state of the external storage device, the control unit stops writing of the log to the external storage device and switches the external storage device to a disconnected state in which the external storage device is removable from the connector.

2. The inverter device according to claim 1, wherein the control unit maintains the external storage device inserted in the connector in the disconnected state while the input unit is receiving the input operation.

3. The inverter device according to claim 1, wherein the control unit maintains the external storage device inserted in the connector in the disconnected state for a predetermined period after the input unit has received the input operation.

4. The inverter device according to claim 1, further comprising a plurality of switches configured to receive the input operation by the user, wherein any one of the switches is set as the input unit.

5. The inverter device according to claim 1, further comprising a plurality of input terminals to each one of which external equipment is connectable, wherein any one of the input terminals is set as the input unit.

6. The inverter device according to claim 1, further comprising a display which is configured to display a state of the external storage device inserted in the connector.

7. The inverter device according to claim 6, wherein the control unit is configured to control the display and when the external storage device inserted in the connector is in the connected state, the control unit controls the display so that information that the external storage device is in the connected state is displayed.

8. The inverter device according to claim 6, wherein the control unit is configured to control the display and when the external storage device inserted in the connector is in the disconnected state, the control unit controls the display so that information that the external storage device is in the disconnected state is displayed on the display.

9. The inverter device according to claim 6, wherein the control unit is configured to control the display, and when the external storage device inserted into the connector has failed in connection to the connector, the control unit controls the display so that information that the external storage device is in a failed state is displayed on the display.

10. The inverter device according to claim 6, wherein a plurality of the connectors is provided and the control unit controls the display so that the state of the external storage device is displayed on the display in such a manner that any one connector in which the external storage device is inserted is discriminated from the other connector or connectors.

11. The inverter device according to claim 6, wherein the control unit is configured to display a free space of the external storage device in the connected state as time of the writable log on the display.

12. The inverter device according to claim 6, wherein the control unit is configured to display an amount of the log stored in the external storage device in the connected state as time on the display.

13. The inverter device according to claim 1, wherein the control unit is configured to manage the logs for every unit log which includes a predetermined number of log elements collected for a predetermined time or a predetermined amount of log elements, storing the logs in the external storage device.

14. The inverter device according to claim 13, wherein when a free space of the external storage device becomes insufficient, the control unit deletes an earliest one of the unit logs stored in the external storage device and writes a latest unit log therefor.

15. The inverter device according to claim 1, wherein the control unit manages the logs for every unit log which includes a predetermined number of log elements collected for a predetermined time or a predetermined amount of log elements, storing the logs in the external storage device; and
   wherein when an input operation has been performed on the input unit while the control unit is writing a unit log to the external storage device in the connected state, the control unit switches the external storage device to the disconnected state after having finished writing the currently written unit log.

16. The inverter device according to claim 1, further comprising an internal storage device which is configured to store the log.

17. The inverter device according to claim 16, wherein when the external storage device has been changed to the disconnected state while the control unit is writing the log to the external storage device in the connected state, the control unit stores the log in the internal storage device as a temporary log and thereafter, the control unit writes the temporary log to the external storage device when the external storage device is again changed to the connected state.

18. The inverter according to claim 16, wherein when no external storage device is in the connected state, the control unit stores the log in the internal storage device as a temporary log and thereafter, the control unit writes the temporary log and a latest log to the external storage device when the external storage device is inserted into the connector and changed to the connected state.

19. The inverter device according to claim 16, wherein the internal storage device has a storage area configured as a ring buffer.

* * * * *